Feb. 1, 1966  H. D. RICE  3,232,202
METHOD FOR PRODUCING ANIMATED PICTURES
Original Filed May 14, 1962  3 Sheets-Sheet 1

INVENTOR.
Harold D. Rice
BY Jacobi & Davidson
ATTORNEYS.

Feb. 1, 1966  H. D. RICE  3,232,202
METHOD FOR PRODUCING ANIMATED PICTURES
Original Filed May 14, 1962  3 Sheets-Sheet 2
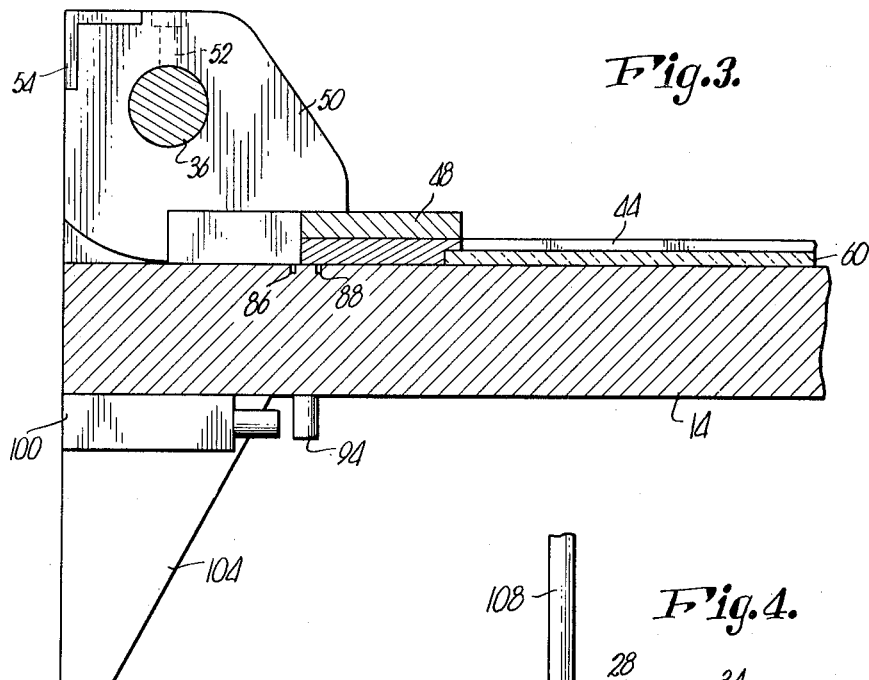
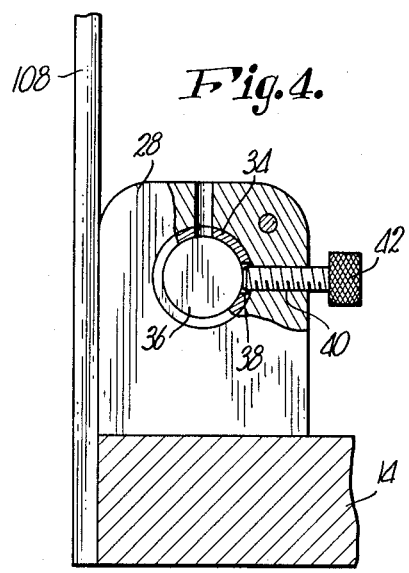
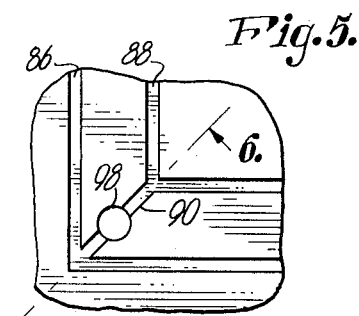
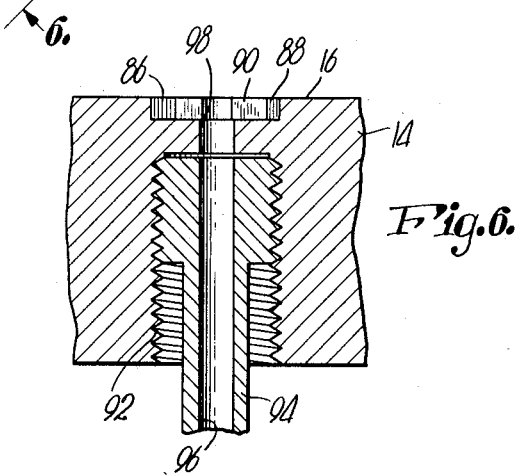
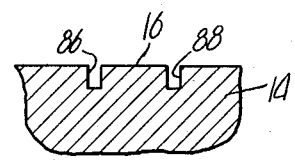
INVENTOR.
Harold D. Rice
BY
ATTORNEYS.

Feb. 1, 1966 H. D. RICE 3,232,202
METHOD FOR PRODUCING ANIMATED PICTURES
Original Filed May 14, 1962 3 Sheets-Sheet 3
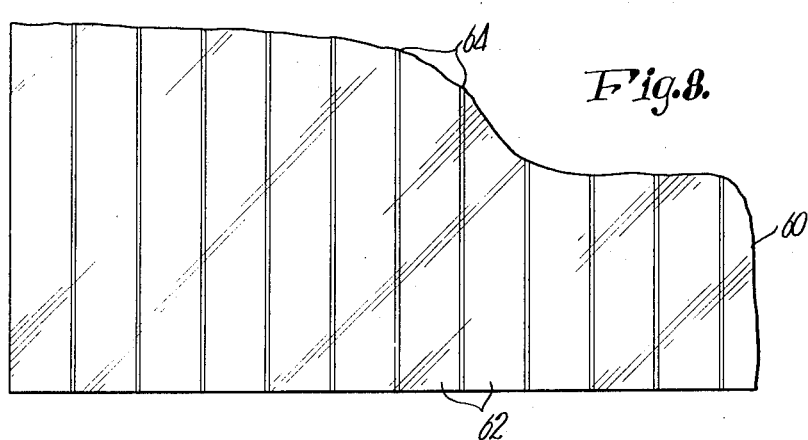
Fig. 8.
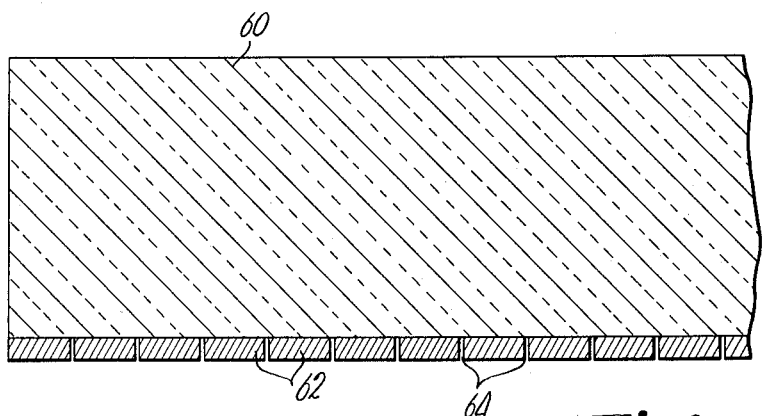
Fig. 9.
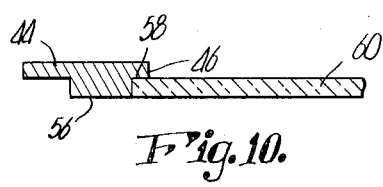
Fig. 10.
Fig. 11.
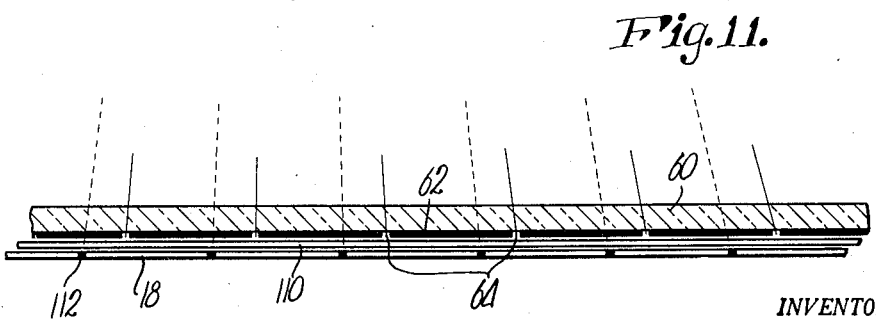
INVENTOR.
Harold D. Rice
BY *Jacolie Davidson*
ATTORNEYS.

United States Patent Office 3,232,202
Patented Feb. 1, 1966

3,232,202
METHOD FOR PRODUCING ANIMATED PICTURES
Harold D. Rice, Leawood, Kans., assignor to Hallmark Cards Incorporated, Kansas City, Mo., a corporation of Missouri
Original application May 14, 1962, Ser. No. 194,383. Divided and this application Nov. 4, 1964, Ser. No. 414,050
2 Claims. (Cl. 95—76)

This application is a division of my copending application, Serial No. 194,383, filed May 14, 1962, and is entitled to the priority date thereof.

This invention relates to photographic equipment, and particularly to a method for producing pictures adapted for utilization with a special lens element to give an illusion of animation to the object of the picture when the picture and lens assembly are viewed from different angles.

Although pictures photographed in a manner to give the illusion of animation to the subject of the picture when a person views the same through a special lenticular lens, have been known for a number of years, difficulties have been experienced in photographing the pictures and producing proper lithographs at a low price and with good quality. The negative for producing a final lithograph is prepared by placing a first negative over the film to be exposed and with the parts of the object to be shown in the final picture disposed in one location. A grid is placed over the negative and film sheet and provided with alternate opaque and light transmitting areas so that narrow strips are exposed on the film sheet by a light source located above the grid. The grid is then moved a distance less than the width of each of the opaque lines thereon and anohter negative placed over the film sheet with the animated portions of the object disposed in a successive location thereof so that upon exposure of the film sheet through the light transmitting areas of the grid, the film will be exposed in a manner so that the object on the negative is transferred to the film in a second position of movement of the same. This procedure is continued until the full film sheet is exposed and all positions of movement of the object transferred to the film sheet have been placed on the film.

The film is processed to produce a negative from which a lithograph is prepared and pictures printed in conventional manner from the lithograph. An assembly giving the illusion of animation may then be formed by dsiposing a suitable lenticular screen over the picture with the number of lenticels, per inch, corresponding to the number of lines on the picture, thus permitting the person to view the different positions of the object illustrated in the picture by altering the angle at which he looks at the lens assembly.

It is, therefore, the primary object of the present invention to provide a method for facilitating the production of animated picture assemblies as described above so that high quality animated pictures may be produced at a relatively low cost and employing conventional, high-speed photographic equipment.

It is a further significant object of the invention to provide a method of utilizing an animation unit as described above embodying novel means for holding the film sheet in proper location during exposure thereof and assuring that the negatives placed thereover, and illustrating the object to be transferred to the film sheet in the various positions of movement thereof, are in proper alignment on the film sheet notwithstanding movement of the grid for successive exposures and substitution of different negatives over the film sheet so that the different positions of movement of the object being transferred to the film are shown on successive exposed lines of the film.

Another very important object of the invention is to provide a method for producing animated pictures which includes improved mechanism for swingably mounting the grid member on the base unit which normally supports the film sheet, permitting the grid to be swung to a position allowing the negatives over the film sheet to be exchanged, but assuring that the grid member is returned to the original location thereof in overlying relationship to the film.

Also an important aim of the invention is to provide a method as set forth above wherein is included precision mechanism for shifting the grid member relative to the film-supporting base unit through very accurate, predetermined, relatively short increments of travel and without shifting of the film sheet during movement of the grid member so that exposures of proper width are assured on the final picture.

A still further important object of the invention is to provide an animation method having improved characteristics noted, wherein a series of composite negatives may be positioned successively over the film sheet for the purpose of transferring the configuration of the object from the different negatives to the film sheet and thus materially decreasing the amount of art work needed in production of the final product and facilitating the photographing procedure by virtue of the fact that only one major piece of art must be produced by hand and then those portions of the object which are shown to be moving, prepared successively by the artist and photo-mechanically combined with the major piece of art to produce the subsequently used composite negatives.

Other objects and details of the method herein will become obvious or be described in greater detail as the following specification progresses.

In the drawings:
FIGURE 1 is a plan view of structure for producing animated pictures in accordance with the method of the present invention, with certain portions thereof being broken away to show details of the structure thereunder;

FIG. 2 is an end elevational view of the rear portion of the sturcture as shown in FIG. 1.

FIGS. 3 and 4 are enlarged, generally vertical cross-sectional views taken substantially on lines 3—3 and 4—4 respectively of FIG. 1;

FIG. 5 is an enlarged, fragmentary view of a section of the upper surface of the base unit of the structure and illustrating the vacuum grooves in the base unit;

FIG. 6 is an enlarged, fragmentary, vertical, sectional view taken substantially on line 6—6 of FIG. 5;

FIG. 7 is an enlarged, fragmentary, vertical (cross-sectional view through the portion of the upper surface of the base unit having the vacuum grooves therein;

FIG. 8 is an enlarged, fragmentary, plan view of the grid member used in connection with the structure for producing animated pictures;

FIG. 9 is an enlarged, fragmentary, end elevational view of the grid member;

Figure 1:
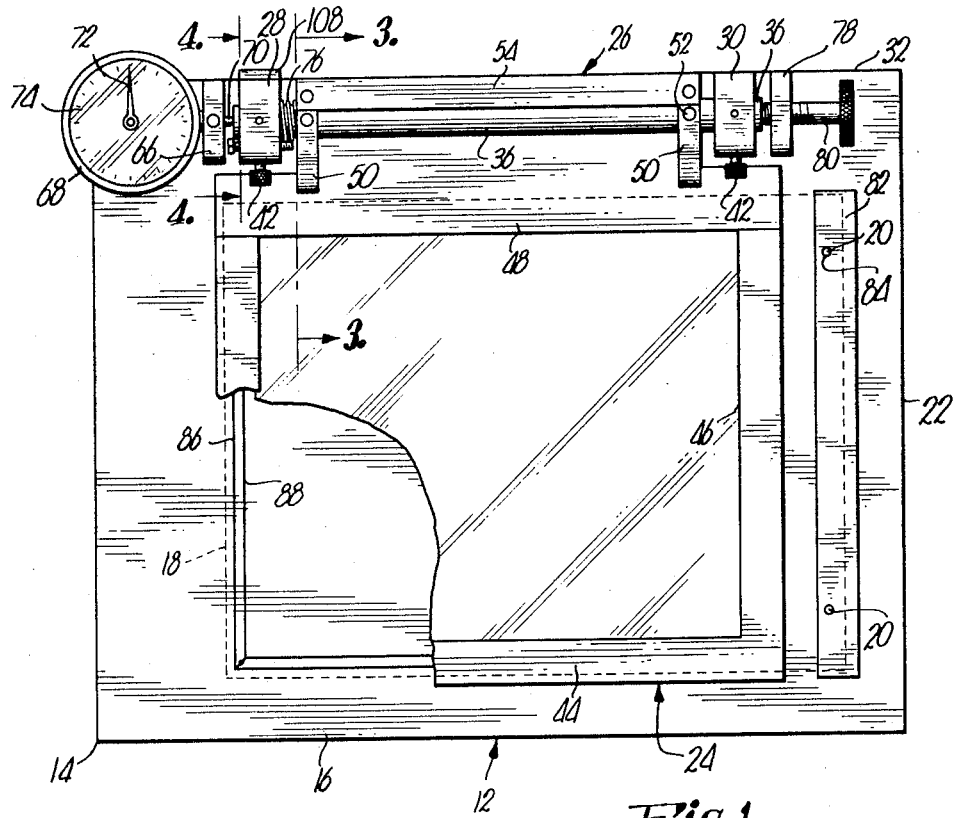

FIG. 10 is an enlarged, fragmentary, vertical, cross-sectional view through one margin of the frame and grid member assembly normally located in overlying relationship to the base unit of the structure; and FIG. 11 is an enlarged, fragmentary, schematic representation of the manner in which a film sheet is exposed by a light source and with the light rays passing through light transmitting areas of the grid member overlying the base unit of the structure and also through a negative disposed in overlying relationship to the film.

Structure for producing animated pictures and for carrying out the method of the present invention is broadly designated by the numeral 12 in the drawings and includes a relatively heavy base unit 14 in the nature of a metal plate having a generally flat, horizontal, rectangular, upwardly facing surface 16 adapted to support a rectangular film sheet 18. A pair of upright pins 20 secured to an elongated planar strip 82 in turn connected to surface 16 of base unit 14 adjacent the margin 22 thereof, projects upwardly from base unit 14 and serve as an alignment means to maintain sheet 18 in proper relationship on surface 16 until vacuum means is activated as to be described hereinafter. The pins 20 serve the function of also retaining negatives on base unit 14.

As is apparent from FIG. 1, film 18 is provided with a pair of apertures therein receiving respective pins 20. A generally rectangular frame 24 is mounted on base unit 14 by combination hinge and frame advancing mechanism generally numerated 26. Mechanism 26 includes a pair of generally upright, parallel shaft mounts 28 and 30 located adjacent the margin 32 of base unit 14 and each having bearing means 34 therein shiftably and rotatably supporting an elongated shaft 36 extending outwardly from opposed surfaces thereof. Bearings 34 are provided with apertures 38 therein (FIG. 4) aligned with threaded passages 40 in shaft mounts 28 and 30 which serve to receive tensioning screws 42 which bear against corresponding aligned areas of shaft 36.

The frame 24 is provided with a generally rectangular grid holder 44 provided with a rectangular, central aperture 46 therein and adapted to be positioned in normal overlying relationship to surface 16 of base unit 14. T-shaped grid plate 48 secured to holder 44 adjacent shaft mounts 28 and 30 serves as a mount for a pair of hinge components 50 located adjacent mounts 28 and 30 respectively. Shaft 36 passes through both of the components 50 and the latter are secured to the shaft 36 by fasteners 52 (FIG. 3). A stabilizing angle 54 interconnects components 50 as illustrated in FIGS. 1 and 3.

The undersurface 56 of holder 44 is provided with a peripheral notch 58 therein surrounding aperture 46 and receiving the margin of a rectangular glass grid member 60. As illustrated in FIGS. 8 and 9, grid member 60 is provided with a series of elongated, generally parallel spaced, opaque lines 62 thereon and which separate relatively narrow, light transmitting areas 64 of grid member 60, one from another. It is to be understood that the light transmitting areas 64 are relatively narrow, of the order of 0.001 inch, while the grid lines 62 are of a width within the range of about 0.006 to 0.015 inch. Because of the provision of opaque segments 62 on glass plate 60, the grid member may be termed a cross line screen if desired. It is to be recognized that suitable adhesive means may be employed to secure grid member 60 in notch 58 of holder 44.

Figure 2:
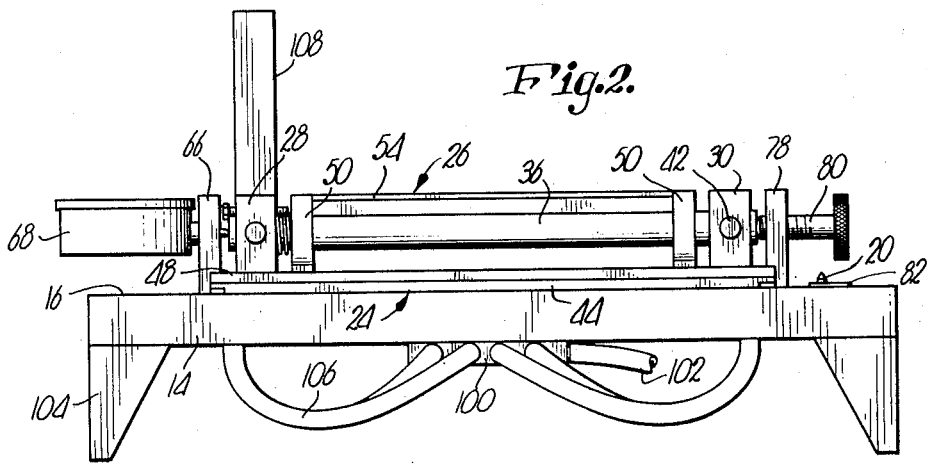

An indicator mount 66 carried by surface 16 of base unit 14 adjacent and in alignment with shaft mount 28, carries a dial indicator 68 provided with a shaft actuator 70 projecting through mount 66 toward shaft 36 (FIGS. 1 and 2. The indicator 68 is provided with a movable needle 72 which is rotatable in response to shifting of actuator 70 and readable in fractions of thousandths of an inch on a suitable scale carried by the face 74 of indicator 68. The scale is rotatable relative to the needle for positioning of the zero number in alignment with needle 72.

Coil spring 76 interposed between opposed faces of shaft mount 28 and the adjacent component 50, serves to bias mechanism 26 to the right, viewing FIG. 1. Adjusting screw mount 78 positioned on base unit 14 adjacent and outboard of shaft mount 30, carries an adjusting screw 80 in engagement with the proximal end of shaft 36 for shifting the latter toward dial indicator 68 as screw 80 is rotated.

Upper surface 16 of base unit 14 is provided with a pair of generally rectangular, complemental vacuum grooves 86 and 88 therein in underlying relationship to holder 44 of frame 24. The corners of grooves 86 and 88 are interconnected by cross recesses 90 as illustrated in FIG. 1, and particularly FIG. 5. Internally threaded bores 92 in the undersurface of base unit 14 and extending upwardly therein immediately below each of the cross recesses 90, receives an elongated, externally threaded member 94 having a central passage 96 therethrough. The members 94 communicate with bores 98 in base unit 14 and which in turn communicate with cross recesses 90 as illustrated in FIG. 5.

A vacuum manifold 100 carried by the underface of base unit 14 is adapted to be coupled to a vacuum pump through line 102. It is to be noted at this juncture that the legs 104 at respective corners of base unit 14, serve to maintain the latter in predetermined spaced relationship from a suitable support for structure 12 and thereby maintain manifold 100 above such support. The vacuum lines 106 communicate manifold 100 with members 94 at the corners of grooves 86 and 88.

An elongated, upright support 108 carried by shaft mount 28, serves as a rest for frame 24 when the latter has been swung away from surface 16 of base unit 14.

While the specific apparatus of the present invention has been detailed above, an understanding of the novel process hereof will be clear from a description of the operation of the preferred embodiment of the apparatus.

*Operation*

It is initially assumed that frame 24 is near the right-hand end of its path of travel viewing FIG. 1. The rotatable dial face of indicator 68 is turned until the zero number thereon is in direct alignment with the pointer 72. It is also to be understood that the vacuum pump is in a de-activated condition or a suitable valve in line 102 maintained in a closed position to prevent vacuum being applied to grooves 86 and 88 through members 94. Next, the frame 24 is swung upwardly away from surface 16 of base unit 14 and placed against the rest 108 on mount 28.

The rectangular, unexposed film sheet 18 having openings therein corresponding to the spacing of pins 20, is placed over surface 16 of base unit 14 in disposition as illustrated in FIG. 1 with the pins 20 serving to maintain such film sheet in proper location relative to grid member 60. The vacuum pump is then activated to cause the air pressure in grooves 86 and 88, as well as cross-recesses 90 to be reduced and thus pulling the margins of film sheet 18 tightly against surface 16.

A negative 110 having lines thereon representing an object or scene in the first position of the animation sequence and provided with openings therein corresponding to the spacing of pins 20, is positioned over film sheet 18 as shown in FIG. 11 and maintained in proper alignment by pins 20 passing through the margin of the negative.

After the negative 110 has been properly positioned over film sheet 18, the frame 24 is lowered to the disposition thereof illustrated in FIG. 3, whereupon a light source located above structure 12 is energized for a predetermined period, whereby the light rays expose narrow sections 112 of the film sheet 18 through the light transmitting areas 64 of grid member 60. As apparent from FIG. 11, the exposed sections 112 of film sheet 18 comprise elongated, spaced lines the full width of aperture 46 in frame 24. The operator next swings frame 24 upwardly to the position thereof against rest 108 and with the vacuum source remaining activated, the first position animation negative is removed from pins 20, and the second position negative placed thereover. Frame 24 is returned to the lower position of the same and adjusting screw 80 is rotated a direction to shift frame 24 toward indicator 68 through a predetermined increment as indicated by the needle 72 on the scale of face 74.

As a specific example only, in utilizing the dimensions previously set forth, the increment through which frame 24 is shifted for each exposure, is determined by the number of images to be transferred to the film sheet 18 in comparison with the width of each of the opaque lines 62. Thus, assuming that five animation position negatives are to be employed and that the width of each opaque line 62 is approximately 0.015 inch, the screw 80 would be rotated until the dial indicator needle had been moved through an increment of 0.003 inch on the scale of face 74.

After all exposures are completed, the vacuum pump is de-activated, whereupon the film sheet 18 is released from surface 16 and developed to produce a positive. Lithographed printing plates are made from the positives and duplicates thereof are printed on paper or other white material employing a lithograph printing press. Final products are produced by placement of lenticular screens over the printed sheets with the lenticles parallel to the pattern formed by the distinct sections 112 on the final picture. The utilization of animation is produced when the angle of vision between the surface of the lenticular screen and the person's eyes undergoes rapid change and thereby causing the viewer to see the different positions of animation of the picture in rapid sequence.

The dial indicator 68 serves the important functions of preventing double exposures on film sheet 18, permits very accurate and rapid shifting of grid member 60 through required increments to provide proper exposure of the film, and negatives the necessity of locating the film sheet 18 at a predetermined exact point at the commencement of the filming sequence.

Having thus described the invention what is claimed as new and desired to be secured by Letters Patent is:

1. A method of producing a lineated animated picture from a successive series of lineated negatives comprising the steps of:
   (1) fixing a photosensitive film on a surface;
   (2) placing the first of said series of negatives in contacting overlying relation to said photosensitive film and in predetermined alignment therewith;
   (3) blocking the light pasage through alternate lineations in the negative toward said film;
   (4) exposing said photosensitive film through said negative to light for a predetermined period to thereby expose lineated sections of a given width of said film;
   (5) thereafter removing said negative from overlying relation with said film;
   (6) placing the next of said series of negatives in overlying relation to said film in said predetermined alignment;
   (7) blocking alternate lineations in the light passage through the next negative in adjacent relation to the lineations of the previous negative and spaced therefrom by said given width;
   (8) repeating steps 4–7 until each negative of said series has been used; and
   (9) then developing said film.

2. The method of claim 1 wherein said step of fixing said film on a surface includes the step of creating a vacuum under the marginal portions thereof.

No references cited.

EVON C. BLUNK, *Primary Examiner.*